US010767386B2

(12) United States Patent
Hilliard et al.

(10) Patent No.: US 10,767,386 B2
(45) Date of Patent: Sep. 8, 2020

(54) WASHER ASSEMBLY FOR USE IN AFFIXING A GUARDRAIL SUPPORT TO A SURFACE

(71) Applicant: Safety Maker, Inc., Houston, TX (US)

(72) Inventors: Andrew Hilliard, Houston, TX (US); Rainer Kuenzel, Hunt, TX (US)

(73) Assignee: Safety Maker, Inc., Houston, TX (US)

( * ) Notice: Subject to any disclaimer, the term of this patent is extended or adjusted under 35 U.S.C. 154(b) by 539 days.

(21) Appl. No.: 15/211,286

(22) Filed: Jul. 15, 2016

(65) Prior Publication Data

US 2018/0016808 A1   Jan. 18, 2018

(51) Int. Cl.
| | | |
|---|---|---|
| E04H 17/00 | (2006.01) | |
| E04H 12/22 | (2006.01) | |
| E04F 11/18 | (2006.01) | |
| E04G 21/32 | (2006.01) | |
| F16B 41/00 | (2006.01) | |
| F16B 43/00 | (2006.01) | |
| F16B 4/00 | (2006.01) | |

(52) U.S. Cl.
CPC ...... *E04H 12/2269* (2013.01); *E04F 11/1812* (2013.01); *E04G 21/3223* (2013.01); *E04H 12/2238* (2013.01); *E04H 12/2261* (2013.01); *F16B 4/004* (2013.01); *F16B 41/002* (2013.01); *F16B 43/00* (2013.01); *Y10T 403/1683* (2015.01)

(58) Field of Classification Search
CPC ............. Y10T 403/1683; F16B 41/002; F16B 43/003; F16B 43/00; F16B 37/043; F16B 37/044; F16B 4/004; E04H 12/22; E04H 12/2238; E04H 12/2261; E04H 12/2269; E04G 21/3223; E04F 11/1812
USPC ............................... 411/533, 999; 256/65.14
See application file for complete search history.

(56) References Cited

U.S. PATENT DOCUMENTS

| | | | | | |
|---|---|---|---|---|---|
| 2,815,789 | A | * | 12/1957 | Hutson | F16B 37/044 411/111 |
| 3,163,198 | A | * | 12/1964 | Zahodiakin | F16B 37/042 411/112 |
| 3,910,588 | A | * | 10/1975 | Austin | E04D 3/3606 411/542 |
| 4,193,435 | A | * | 3/1980 | Frosch | F16B 37/044 411/103 |
| 4,571,133 | A | * | 2/1986 | Lindow | F16B 31/04 411/11 |
| 4,663,910 | A | * | 5/1987 | Hasan | F16B 43/001 411/533 |
| 4,732,519 | A | | 3/1988 | Wagner | |
| 4,780,039 | A | * | 10/1988 | Hartman | E04D 3/3603 411/369 |
| 4,815,908 | A | * | 3/1989 | Duran | F16B 5/0208 411/103 |

(Continued)

FOREIGN PATENT DOCUMENTS

| | | |
|---|---|---|
| DE | 8900523 | 3/1989 |
| DE | 102013008503 | 11/2014 |
| WO | WO 2008/046436 | 4/2008 |

*Primary Examiner* — Matthew R McMahon
(74) *Attorney, Agent, or Firm* — Bushman Werner, P.C.

(57) ABSTRACT

A washer assembly for use in affixing a guardrail support to a floor surface. The washer assembly holding at least one washer in place such that it does not fall out during assembly of the guardrail, disassembly of the guardrail, or transport of the materials.

6 Claims, 3 Drawing Sheets

(56) References Cited

U.S. PATENT DOCUMENTS

| | | | | |
|---|---|---|---|---|
| 4,906,153 A * | 3/1990 | Duran | F16B 5/0208 | 411/103 |
| 4,940,377 A * | 7/1990 | Reynolds | B21D 53/24 | 411/222 |
| 5,018,329 A * | 5/1991 | Hasan | E04D 3/3603 | 411/369 |
| 5,073,070 A * | 12/1991 | Chang | F16B 5/0208 | 411/105 |
| 5,082,412 A * | 1/1992 | Thomas | E04D 3/3603 | 411/368 |
| 5,238,321 A | 8/1993 | Jarjoura | | |
| 5,560,588 A | 10/1996 | Hilliard | | |
| 5,766,019 A * | 6/1998 | Matsumoto | B60R 16/027 | 439/15 |
| 6,676,345 B2 * | 1/2004 | Szczukowski | F16B 5/0241 | 411/533 |
| 6,910,826 B1 * | 6/2005 | Damiano | F16B 37/00 | 403/2 |
| 6,935,823 B2 * | 8/2005 | Mitts | F16B 37/061 | 411/111 |
| 7,234,689 B2 * | 6/2007 | Kuenzel | E04G 21/3233 | 182/106 |
| 7,591,622 B2 * | 9/2009 | de Jesus | F16B 37/044 | 411/108 |
| 7,699,570 B2 * | 4/2010 | Trotter | F16B 37/044 | 411/533 |
| 8,064,195 B2 * | 11/2011 | Zhang | G06F 1/187 | 211/26 |
| 8,506,224 B2 * | 8/2013 | Cosenza | F16B 41/002 | 411/353 |
| 8,591,157 B1 * | 11/2013 | Stewart | F16B 31/028 | 411/10 |
| 8,678,338 B2 * | 3/2014 | Lin | F16B 5/0208 | 248/609 |
| 9,551,456 B2 * | 1/2017 | Peters | F16B 5/0241 | |
| 9,970,473 B2 * | 5/2018 | Haas | F16B 39/38 | |
| 2009/0123220 A1 * | 5/2009 | Chou | F16B 37/043 | 403/21 |

* cited by examiner

WASHER ASSEMBLY FOR USE IN AFFIXING A GUARDRAIL SUPPORT TO A SURFACE

FIELD OF THE INVENTION

The present invention relates to a support for a temporary guardrail, in particular to a support with an improved washer assembly.

BACKGROUND OF THE INVENTION

OSHA prescribes a number of safety measures which must be taken to protect workers while a building is under construction, and these may also serve to protect other persons, such as an owner or prospective purchaser who wishes to see the building while under construction. Among these are requirements for temporary guard railings to be erected along the edges of floor surfaces where there is no wall or other restraint, and from which there is a sufficient vertical drop to present a serious hazard should a person fall from the edge of the floor surface.

Undesirable amounts of time and materials may be used where the temporary guard railing is constructed in a conventional manner, i.e., from wood mounted to the building being constructed. Additional time is spent in removing the temporary guard railing when it is no longer needed, and even if some of the materials from that temporary railing can be re-used, it is usually necessary to disassemble that material and reconstruct a guard rail from the reused material.

It can be appreciated that the construction of a guard rail requires the erection of a series of vertical posts to which the lateral railings and toe boards, where required, are connected. Such posts must be firmly secured to the floor surface and fairly rigid. OSHA requires that such posts must be capable of withstanding, without failure, 200 pounds of pressure applied within two inches of the top of a forty-two inch post in an outward or downward direction. Thus, in conventional construction methods, the post would have to be securely braced with respect to the floor surface, e.g., by a plurality of wooden struts.

U.S. Pat. No. 5,560,588 ('588 patent), incorporated herein by reference for all purposes, discloses a support which eases the construction of such temporary guard railing, helps to insure the required strength and rigidity of the railing, and makes it easier for materials to be moved onto the floor bounded by the guard railing. Furthermore, the support, preferably along with a post connected thereto, can be readily removed and re-used. The support, whether in its initial use or re-use obviates some of the more difficult and time consuming aspects of conventional rail construction techniques, and its re-usability is therefore particularly time and cost effective, and all the more so when the post connected thereto can also be re-used without disassembly from the support.

The support of the '588 patent comprises a base adapted to be removably attached to a floor surface, and support walls upstanding from the base and defining therebetween an upwardly opening socket for receipt of a post. The base of the support of the '588 patent can be quickly and easily secured in place and removed, as by wood screws passing through holes in the base and into the floor.

No matter the design, strength, or convenience of the prefabricated support, the guardrail will fail to meet OSHA standards if it is not properly affixed to the floor surface. The different surface to which the supports are affixed, e.g., concrete, particle board, and wood, require different fasteners, e.g., lag screws, masonry fasteners, or concrete anchors. All such fasteners require the use of washers, typically fender washers. Washers can fall out of packages or be misplaced during the assembly/disassembly of the guardrails. Affixing the support to the floor surface without washers or with incorrect washers compromises the guardrail's ability to meet OSHA standards.

SUMMARY OF THE INVENTION

In one aspect, the present invention provides a washer assembly for securing a guardrail support to a support surface.

These and further features and advantages of the present invention will become apparent from the following detailed description, wherein reference is made to the figures in the accompanying drawings.

DETAILED DESCRIPTION OF PREFERRED EMBODIMENTS

As used herein, the terms "floor," "floor surface," and similar terms include virtually any generally horizontal surface such as a floor, a balcony, a step of a stairway, or a landing of a stairway. Such a floor surface will be considered "open" if there is no wall, permanent guard railing, or other restraint along its edge. It should be understood that such open floor edges can occur along the outer periphery of, for example, a floor or balcony, and can also occur inwardly from the edge, e.g., if the floor has an opening for receipt of a skylight, attic hatch, or the like.

Terms such as "horizontal," "vertical," "upward," and the like are used herein with respect to such normal orientation in use, and not in a limiting sense.

Figure 1:
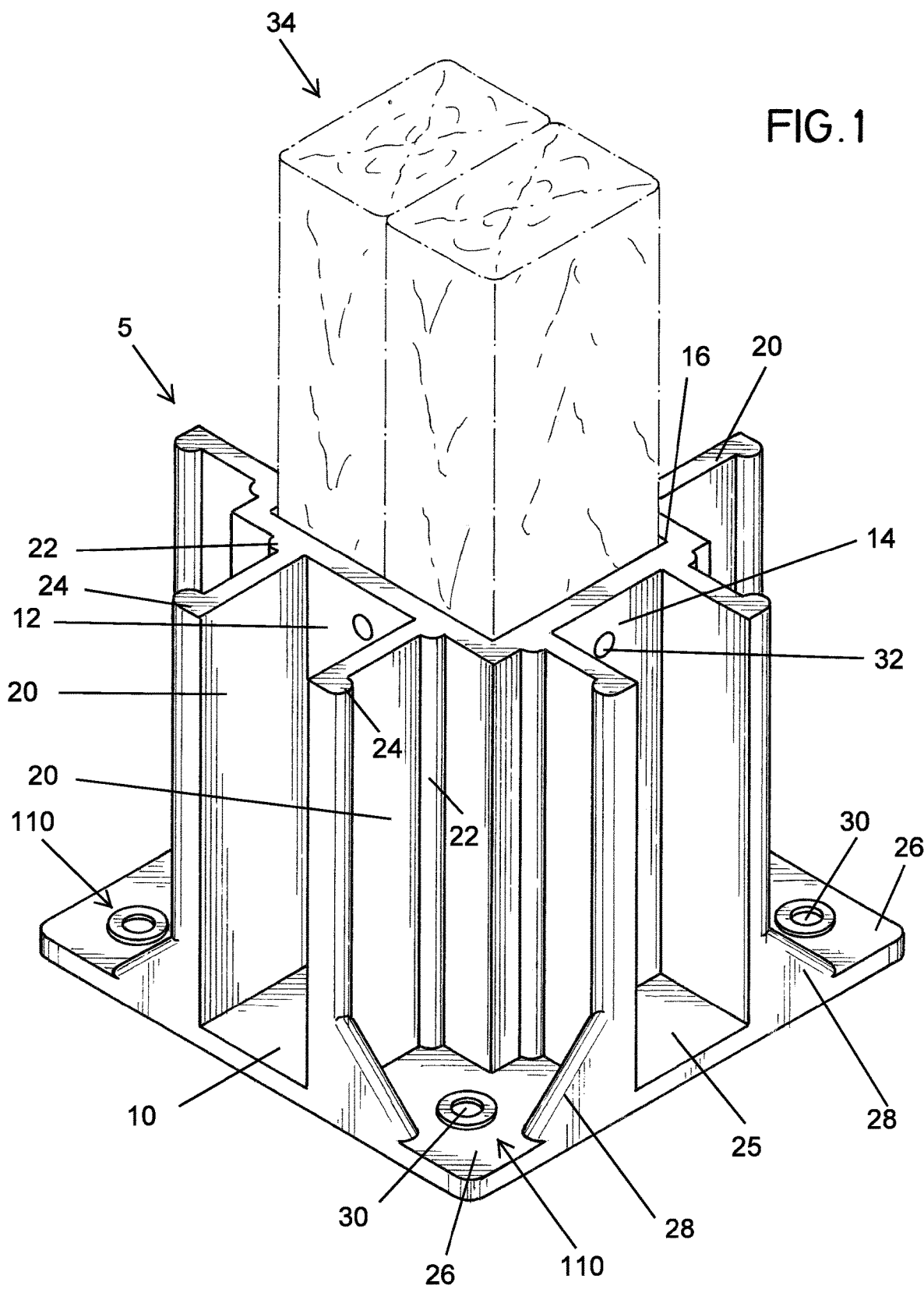
FIG. 1 is a perspective view of a support for forming a temporary guardrail having one embodiment of the washer assembly of the present invention.

Referring now to FIG. 1, there is shown a support 5. The support 5 comprises a rectangular base 10. In normal use, base 10 will be mounted against a generally horizontal floor surface, in a manner to be described more fully below.

The support 5 comprises four support walls 12, 14, projecting upwardly from the base 10. The walls 12, 14 are arranged to define there between a socket 16 of generally rectangular cross-section, the longer walls 12 being parallel to and opposed to each other, and the shorter walls 14 also being parallel and opposed to each other, as well as perpendicular to the longer walls 12. While the walls 12, 14 could be discontinuous, e.g., could comprise a plurality of free standing flanges, it is preferable that they be directly adjoined to one another to form a complete enclosure defining the socket 16. This greatly enhances the strength of the walls defining the socket, thereby minimizing the wall thickness required, as well as the need for additional bracing. Indeed, in the embodiment shown in FIG. 1, the entire support device is a continuous monolithic structure formed of a suitable hard plastic material.

The purpose of the socket 16 is to receive and support a stanchion, e.g., a wooden post, to which generally horizontally extending rails may be attached. The socket 16 can sized to hold a wooden post 34 comprised of two 2×4's (shown in phantom) attached together along their wider sides. After insertion, the post 34 is connected to the walls 12 and 14 as by male connectors such as wood screws. Although it is possible, in some embodiments, to drill through the walls 12 and 14 to accommodate these screws, in the embodiment show, the preformed holes 32 are sized to accommodate the desired size screw.

The rectangle defined by walls 12 and 14 is smaller than that defined by base 10, and is centrally located on the base 10. Projecting laterally outwardly with respect to each of the walls 12 and 14 is a respective pair of parallel rail guide flanges 20. These flanges could be connected only to the respective walls 12 or 14 rather than both walls 12 or 14 and base 10 as shown; alternatively, they could be connected only to the base 10. However, it is highly preferred that they be directly adjoined to both the base 10 and their respective walls 12 or 14, as shown. Thereby, they not only serve as rail guides, in a manner to be described below, but also serve as bracing members enhancing the rigidity of the walls 12 and 14.

In many circumstances, e.g., where there is a significant distance between adjacent posts 34, OSHA requires that toe boards be provided. A toe board is a rail disposed closely adjacent the floor, which prevents building materials, debris, tools, etc., from falling over the open edge of the floor. The toe boards should be at least 3½" in height, and according, 2×4's are typically used for the toe boards. The channels formed by the respective pairs of flanges 20 are sized to slidably accommodate 2×4's. However, the flanges 20 are generally six inches high, and can therefore also accommodate two 2×4's, to effectively provide a seven inch high toe board. Socket 16 is also preferably about six inches high to provide adequate rigidity for the post without excessive wall thickness or bracing.

Rigidity is further enhanced by beads 22 and 24 formed on the outer side of each flange 20. Bead 22 runs vertically along the inner end of the flange 20, i.e., that end which adjoins the adjacent wall 12 or 14, and bead 24 runs along the outer or free end of the flange 20.

The flanges 20 preferably extend laterally outwardly from their walls 12 or 14 just to the outer edge of the base 10, as shown. Corner areas 26 of the base 10 are exposed between the flange of perpendicular pairs of walls 12 and 14. Further support is provided by gussets 28, each of which interconnects the lower outer edge of a respective flange 20, and more specifically its bead 24, to the base 10 in the adjacent corner area 26.

Various design elements of the support contribute to its strength and rigidity. The details of one embodiment of a guardrail support are provided to show the various features included to improve the strength and rigidity of the support. This underscores the importance of a strong fastening system. Without a strong fastening system to hold the support to the floor surfaces, the myriad of advantages built into the guardrail supports are lost.

A hole 30 is provided in each of the corner areas 26, and a hole 32 is formed through each of the walls 12 and 14, near its upper end, and about midway between its lateral extremities. Washer assembly 110 (see FIG. 2) is seen in part in FIG. 1 at each hole 30. The support 5, with the post secured therein, is placed in the desired position on the floor surface, and secured thereto by other male connectors, e.g., wood screws (not shown), inserted through holes 30 in the base 10 and into the floor.

Figure 2:
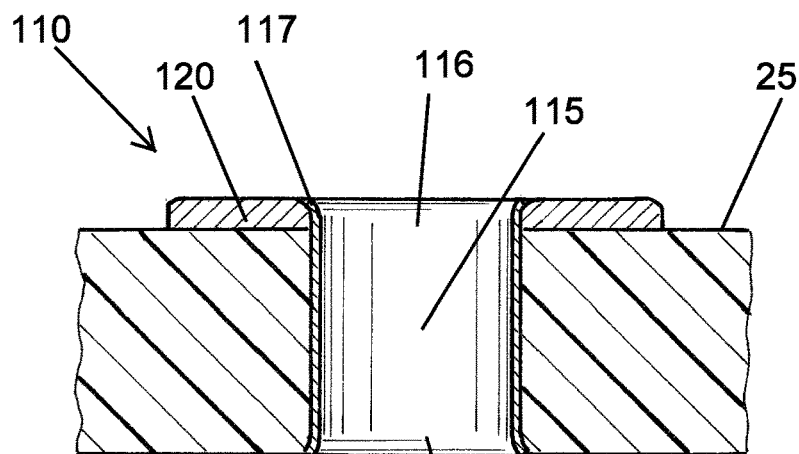
FIG. 2 is an elevational cross-sectional view of one embodiment of the washer assembly of the present invention.

Turning to FIG. 2 there is shown in detail the washer assembly 110 of FIG. 1. Disposed within hole 30 is a thin walled tubular member 115. Tubular member 115 extends above the top surface 25 of base 10. In a preferred embodiment, the uppermost and lowermost ends 116 and 118, respectively, of tubular member 115 flare radially outwardly forming flanges 117 and 119, respectively. Washer 120 is disposed in surrounding relationship to a portion of tubular member 115 such that flange 117 overlies the radially innermost edge of washer 120 thereby holding it in place. Flange 119 of tubular 115 engages the bottom surface 27 of base 10 and prevents tubular member 115 and from failing out of hole 30 during transport or installation. Alternatively, bottom flange 119 could be dispensed with in lieu of tubular member 115 being press-fitted into hole 30. Tubular member 115 can be made of any strong, durable material, preferably a metal or alloy, such as cold rolled steel. Tubular member 115 is preferably made of non-corrosive material, such as stainless steel, or has a non-corrosive coating, such as galvanized steel.

Figure 3:
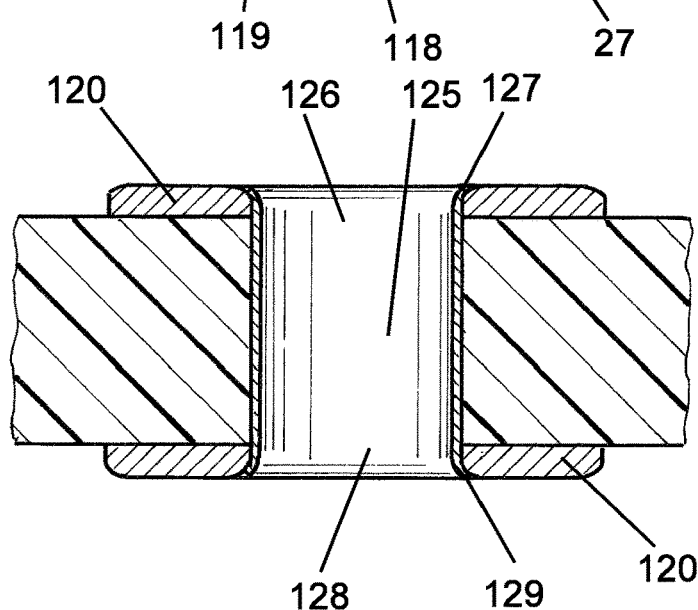
FIG. 3 is an elevational cross-sectional view of another embodiment of the washer assembly of the present invention.

FIG. 3 shows an embodiment similar to FIG. 2. The embodiment of FIG. 3 employs a longer tubular member 125 which engages washers 120 on both the top surface 25 and the bottom surface 27 of base 10. The the uppermost and lowermost ends 126 and 128, respectively, of tubular member 115 flare radially outwardly forming flanges 127 and 129, respectively. Flanges 127 and 129 hold washers 120 in place and prevent the tubular member 125 from falling out of hole 30.

Figure 4:
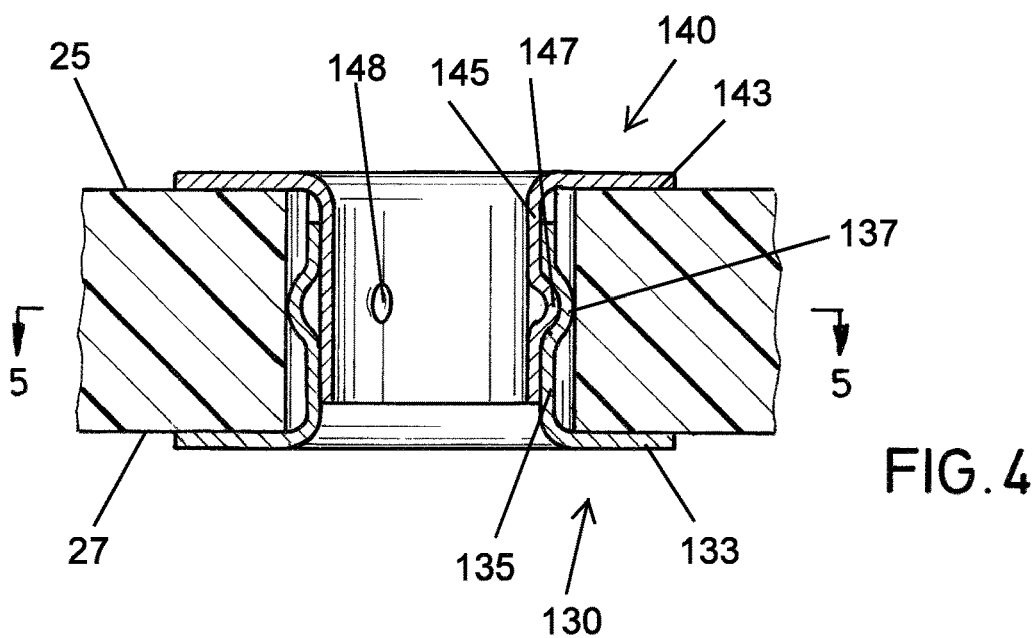
FIG. 4 is an elevational cross-sectional view of yet another embodiment of the washer assembly of the present invention.
Figure 5:
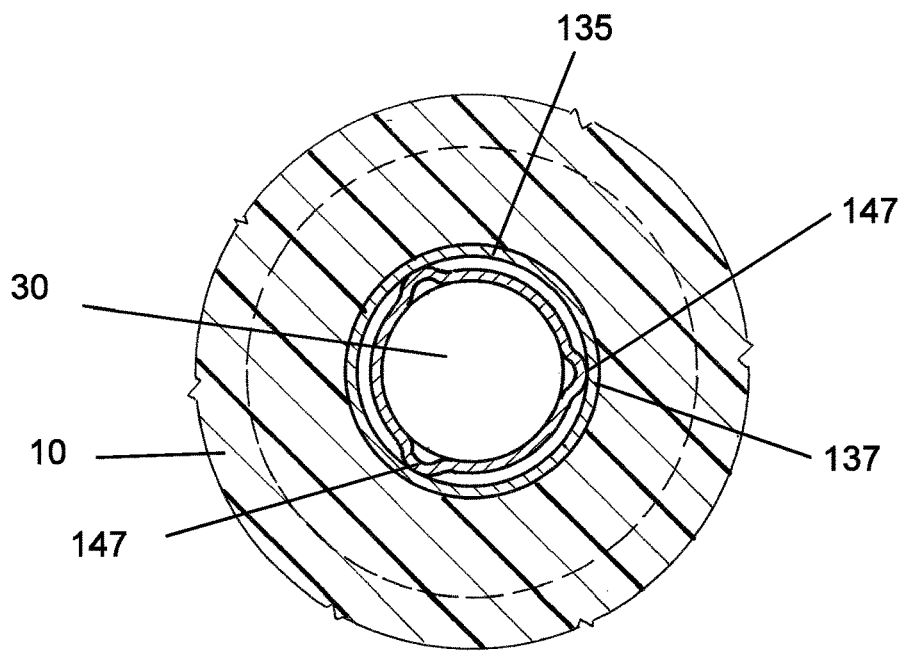
FIG. 5 is a view taken along the lines 5-5 of FIG. 4.

Turning to FIGS. 4 and 5, there is shown another embodiment of the present invention. The embodiment of FIGS. 4 and 5 comprises a pair of flanged washers 130. Flanged washer 130 is comprised of a flange 133 and a sleeve 135. In like fashion, flanged washer 140 is comprised of a flange 143 and a sleeve 145. Sleeve 135 of flanged washer 130 is disposed in surrounding relationship to sleeve 145 of flanged washer 140. Sleeve 135 has a radially outwardly projecting annular bend or bulge which forms annular rib 137. Sleeve 145 comprises a plurality of circumferentially spaced radially outwardly projecting dimples 147. When assembled, flanged washers 130 and 140 are positioned such that dimples 147 are nested within projecting rib 137. In a preferred embodiment, sleeve 145 has three equally spaced dimples 147. The engagement of dimples 147 within rib 137 prevents axial movement of flanged washers 130 and 140 relative to one another.

As seen in FIG. 4, sleeve 145 has opening 148. Opening 148 allows a user to reach an appropriate sized tool into the assembly, through opening 148, and pry sleeve 145 out from sleeve 135. Only one opening 148 is shown in sleeve 145 but it will be appreciated that multiple openings 148 may be included within sleeve 145.

As shown in FIG. 4, flanged washer 130 having the radially outer sleeve 135 is positioned such that flange 133 engages bottom surface 27 of base 10. It will be appreciated that the invention is not so limited and that an assembly in which the position of the two flanged washers 130 and 140 is opposite is within the scope of the invention.

Figure 6:
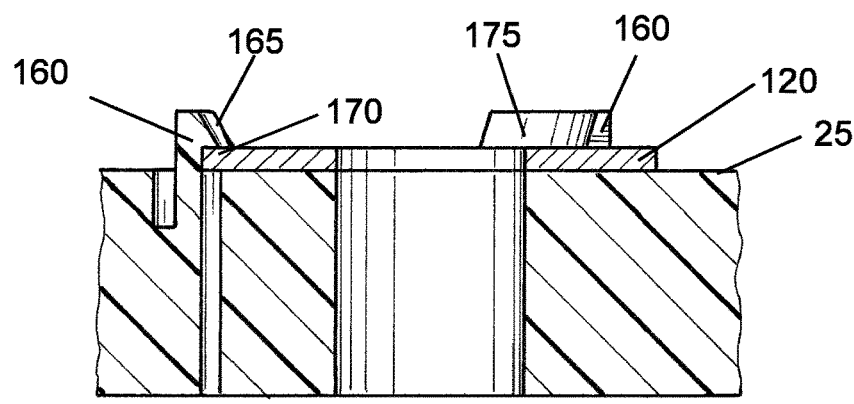
FIG. 6 is a view taken along the lines 6-6 of FIG. 7.
Figure 7:
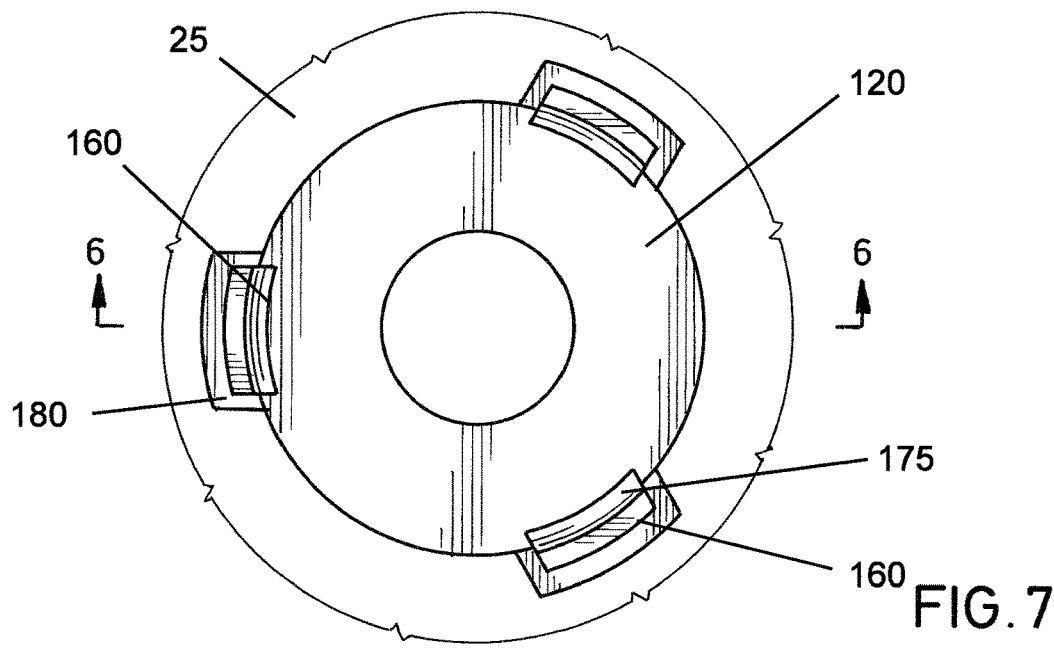
FIG. 7 is a plan view of another embodiment of the washer assembly of the present invention.

Turning to FIGS. 6 and 7, there is shown an embodiment of the present invention which employs standard fender washers 120 held in place by a plurality of circumferentially spaced fingers 160. In a preferred embodiment, the washer assembly includes three circumferentially spaced fingers 160. Each finger 160 is integrally/monolithically formed with base 10 and projects above surface 25 of base 10. Each finger 160 has a radially inwardly extending dog 165 having an undercut surface 170. In a preferred embodiment, each finger 160 also has a chamfered surface 175. Positioned around each finger 160 is a groove 180 which extends into top surface 25 of base 10.

Should the washer 120 need to be removed/replaced, the user can press against chamfered surface 175 to bend 160 outwardly. Groove 180 allows 160 to be bent outwardly such that dog 165 no longer holds washer 120 in place and washer 120 can be removed. New washer 120 can then be pressed against chamfered surface 175 which will force fingers 160 radially outwardly until washer 120 is in position on surface 25 of base 10.

In a preferred embodiment, the assembly of the present embodiment is injection molded and the washer 120 put in place between fingers 160 after the injection molding process, but while the plastic material is still warm and pliable. As the plastic cools, the fingers 160 will stiffen, holding the washer in place.

Each of the embodiments described above maintains at least one washer of the desired size in position to allow the guardrail support to be affixed to the floor surface. The embodiments each hold the washer(s) in position while maintaining an opening through base 10 to allow for lag screws, concrete anchors, or the like.

The washer assembly of the present invention provides great advantage to guardrail supports such as those taught by the '588 patent. By ensuring the required washers remain in position, the proper installation of the guardrail supports can more easily be accomplished. The present invention thus (1) saves time by eliminating the need to search for washers of the proper size, (2) saves money by reducing the number of lost washers to be replaced, and (3) improves safety by ensuring the proper washers are installed. As described above the various strength and rigidity features of the walls, rail guide flanges, beads, and bracing members of the guardrail support and completely negated if the guardrail support is not affixed to the floor surface properly.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A support for temporary guard railing comprising:
   a base adapted to be removably attached to a floor surface, said base having an upper surface, a lower surface, a peripheral edge, and corner areas;
   support walls upstanding from the base and defining therebetween an upwardly opening socket for receipt of a post;
   at least one hole extending through each of said corner areas for receipt of a connector so as to attach the base to the floor surface;
   at least one hole having a washer assembly, wherein said washer assembly comprises:
     a plurality of fingers integrally formed with said base and projecting from said upper surface of said base, said fingers being circumferentially spaced around said hole, each of said fingers comprising a radially inwardly extending dog, there being a notch formed between each of said dogs and said upper surface of said base;
     an upwardly facing groove positioned around one of said fingers and extending into said upper surface of said base, said fingers and said groove being spaced from said peripheral edge of said base;
     a washer received in said plurality of notches, such that the opening of said washer is in register with said hole.

2. The support of claim 1, wherein said fingers are elastically connected to said base.

3. The support of claim 2, wherein each of said dogs have a chamfered surface.

4. The support of claim 1, wherein a plurality of said holes have washer assemblies.

5. The support of claim 1, wherein said washer assembly comprises a plurality of upwardly facing grooves, each of said grooves positioned around a respective one of said fingers and extending into said upper surface of said base.

6. The support of claim 5, wherein said plurality of grooves are spaced from said peripheral edge of said base.

\* \* \* \* \*